Figure 1:
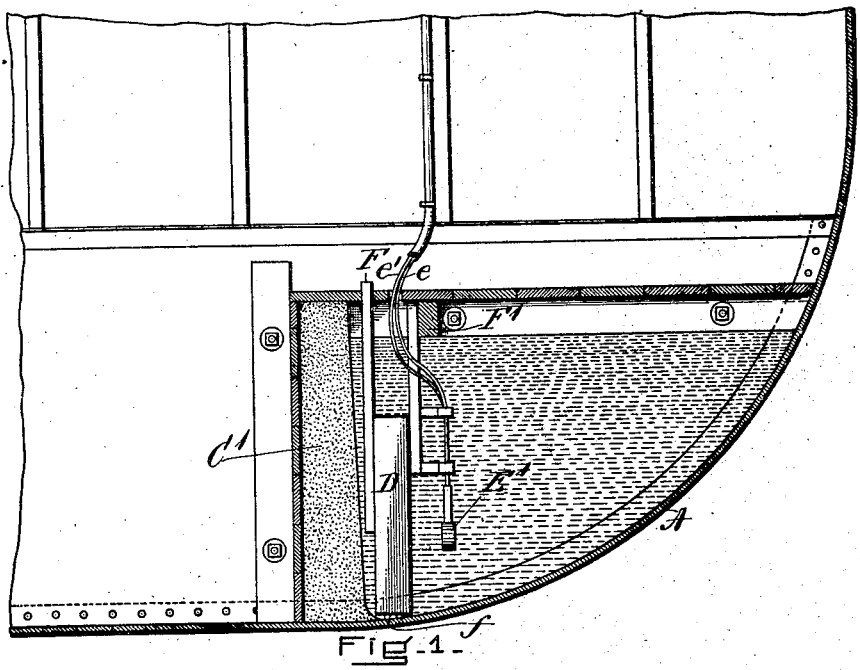

R. L. WILLIAMS.
SOUND SCREEN.
APPLICATION FILED MAR. 11, 1909.

1,067,207.

Patented July 8, 1913.
3 SHEETS—SHEET 1.

R. L. WILLIAMS.
SOUND SCREEN.
APPLICATION FILED MAR. 11, 1909.

1,067,207.

Patented July 8, 1913.
3 SHEETS—SHEET 2.

WITNESSES:
M. E. Flaherty.
W. P. O'Brien.

INVENTOR:
Robert L. Williams

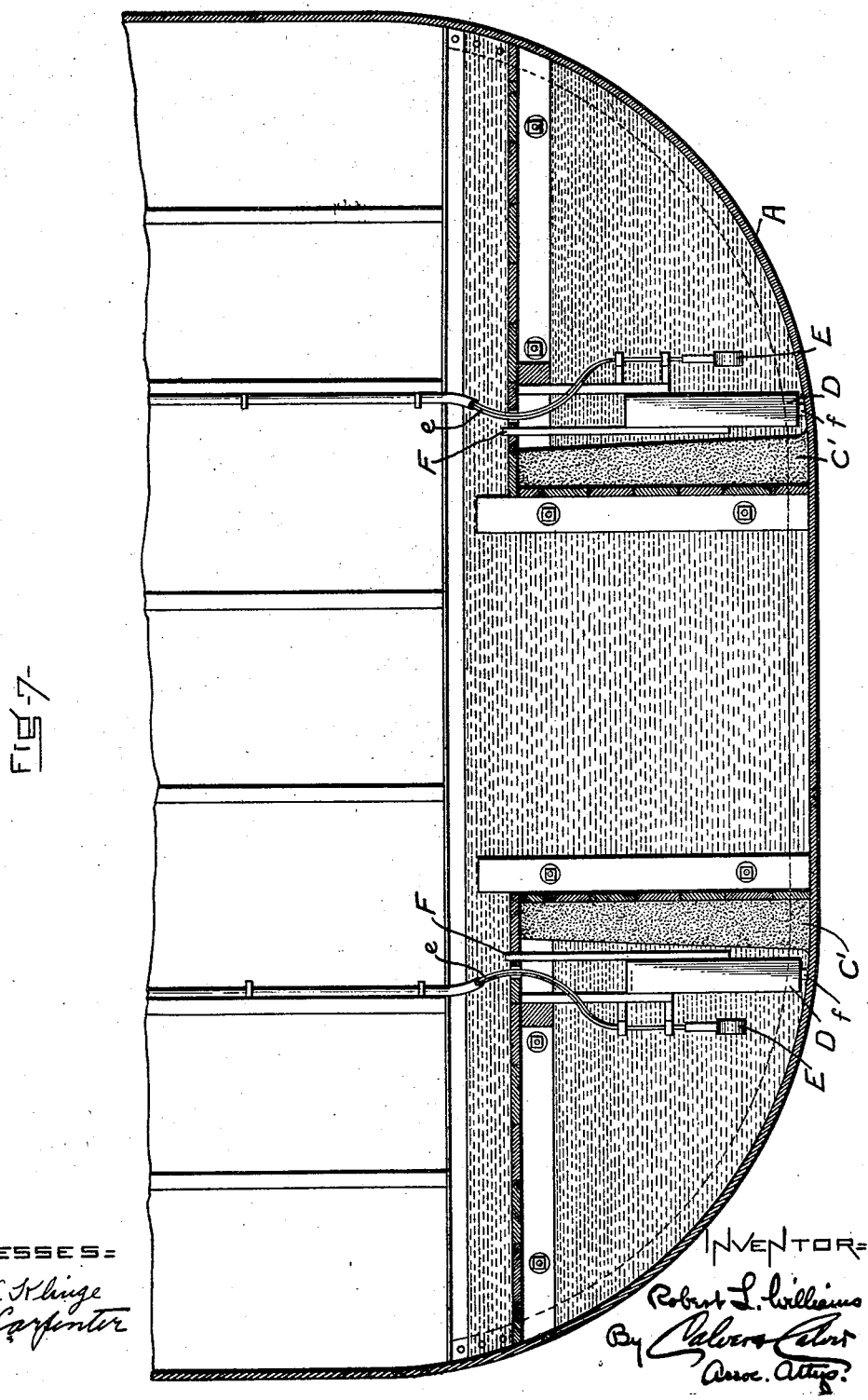

UNITED STATES PATENT OFFICE.

ROBERT L. WILLIAMS, OF NEWTON, MASSACHUSETTS, ASSIGNOR TO SUBMARINE SIGNAL COMPANY, OF WATERVILLE, MAINE, A CORPORATION OF MAINE.

SOUND-SCREEN.

1,067,207.

Specification of Letters Patent.

Patented July 8, 1913.

Application filed March 11, 1909. Serial No. 482,664.

*To all whom it may concern:*

Be it known that I, ROBERT L. WILLIAMS, of Newton, in the county of Middlesex and State of Massachusetts, a citizen of the United States, have invented a new and useful Improvement in Sound-Screens, of which the following is a specification.

In submarine signaling sound waves are projected from their source somewhat like rays from a common center and suitable apparatus is provided on board ships to receive and transmit them to a receiver in the pilot house. For this purpose, at least one transmitter is provided on each side of the ship near the bow so that comparison may be made between the strength of the vibrations as received from each side of the ship and so the direction of the ship's course with reference to the point of origin of the sound may be determined. Where two transmitters are used on each side of the ship they are arranged in pairs, one pair, consisting of one transmitter on each side of the ship, being used at a time, the other pair being used in case of accident or for comparison.

The details of the use of the transmitters are not fully described in this application as they are now well known and form no part of this invention.

As a means of getting superior results a water tank is usually provided on each side of the ship attached to its inner wall, the receiving transmitters being hung in each tank. As, however, not only does the transmitter (being usually between two and three inches in diameter), offer a comparatively small surface for the reception of the sound waves so that many of the sound waves radiating from a given point pass it, but to a certain extent the waves pass through it and around it and so may reach the rear of the transmitter on the other side of the ship and affect it. The duty of each transmitter is to receive and transmit to the pilot house sound waves approaching its own side of the ship. At the pilot house they are compared with the sound waves transmitted through the other transmitter; and it is of course apparent that if each transmitter transmits not only the sound waves which approach it in front but also those which approach it from the rear the result will be confused and no proper comparison can be made. This passage of sound waves across the ship is especially likely to happen when from necessity the transmitter tanks are located in a water ballast tank extending the width of the ship such as is often constructed in the bows of freight steamers especially those used upon the Great Lakes.

My invention is intended to prevent the passage of undesirable sound waves to a transmitter, by locating between it and the source of sound waves a screen composed of layers of materials having different sound-transmitting properties arranged alternately within a suitable tight casing into which water cannot leak. Such a device when made somewhat larger in area than the area of the transmitter has been found to cut off the passage of sound waves approaching the transmitter from the rear or from any other undesirable direction and has greatly increased the value of the transmitter.

It is a well known scientific fact that different materials allow sound to pass through them at different velocities and I use the term "different sound-transmitting properties" with that fact in view.

The preferred form of my invention and of its location with respect to the transmitters is shown in the drawings, in which—

Figure 2:
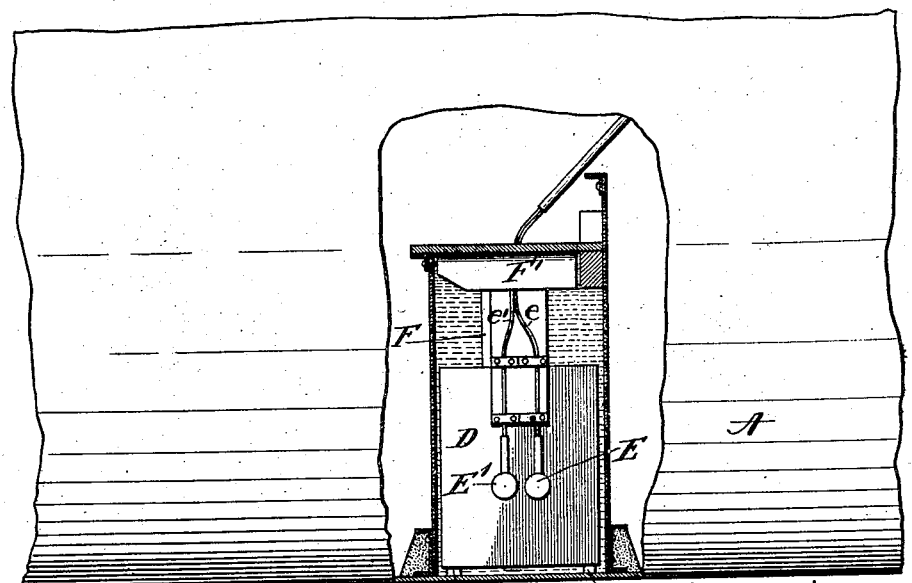
Figure 3:
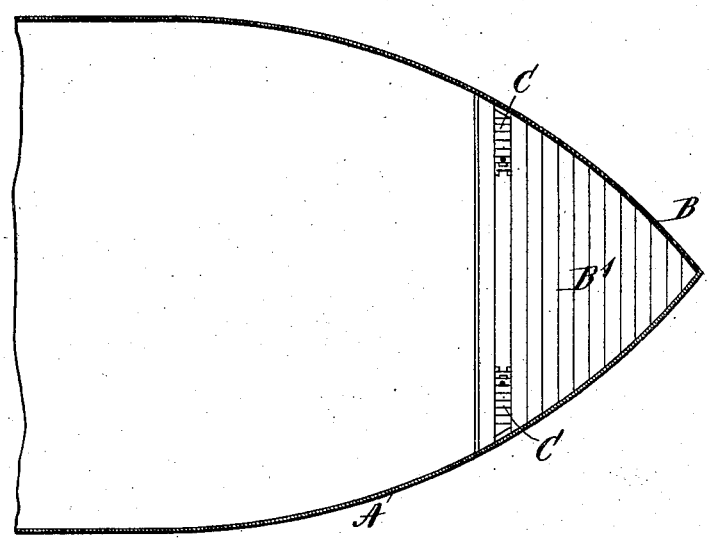
Figures 4, 5:
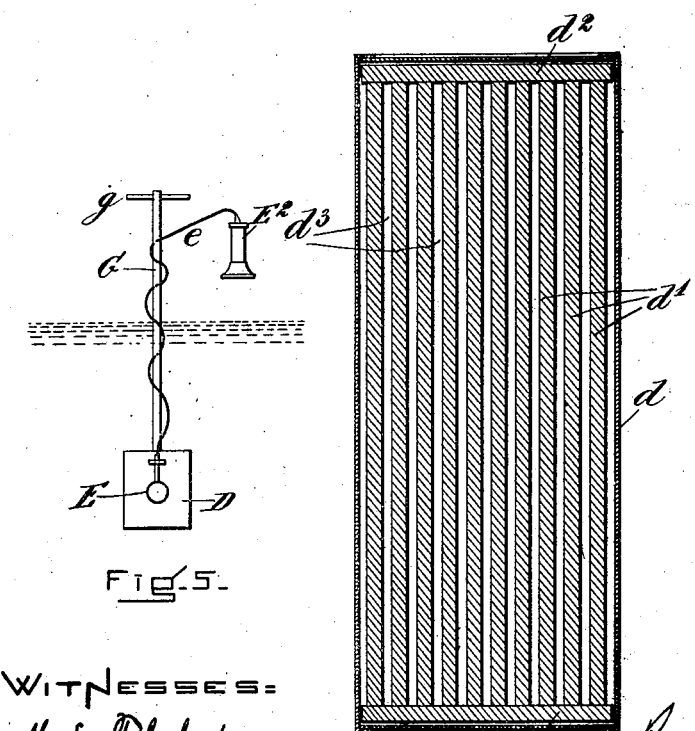
Figure 6:
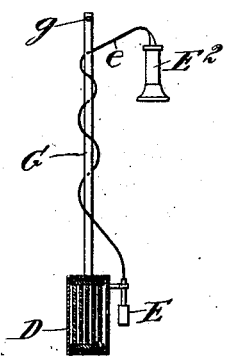

Figure 1 is the cross section of a portion of the hull of a ship taken between two of the ship's floors or walls of the tank. Fig. 2 is an elevation of the side of a ship, a portion of the hull being cut away to show one end of the tank. Fig. 3 is the plan of the bow of a ship showing the location of the tanks. Fig. 4 is a cross section of a device embodying my invention. Fig. 5 is a diagrammatic view of a sound screen capable of use under circumstances below stated, and Fig. 6 is a view at right angles to Fig. 5 showing a section of such a sound screen. Fig. 7 is a transverse section through the forward portion of the ship's hull showing the relative positions of the microphones and sound screens.

A is the ship's hull. The bow B of the ship as shown is provided with floors, so called, lettered B¹ which are vertical braces of sheet steel usually the width of the bow. In vessels in which water ballast is carried, the forward floors are often perforated to connect the chambers between the floors and form a single tank which may be flooded for that purpose, the rear floor being solid to form one end of the tank. It is very desirable that the transmitter tanks shall be near the bow and for that reason when possible the position between two of these floors in the ballast tank has usually been chosen for the construction or location of the transmitter tanks. As shown in Fig. 3 they are located at C, C, two tanks being shown, one on each side of the ship.. In this case the floors between which the tank is constructed form the side walls of the tank, the outer wall being formed by the hull and the fourth or inner wall $C^1$ of any other material, say cement or concrete, by which a watertight construction may be secured so that the tanks will retain water should the water ballast be withdrawn.

D is the screen in front of which are supported two transmitters E, $E^1$, one belonging to each of two sets. These transmitters are connected by suitable conductors $e$, $e^1$ with the receiving instruments in the pilot house. The screen D in its preferred form is made substantially the full width of the tank and as high as may be convenient. It may have the full area of the rear wall of the tank or may be somewhat less in height, but the more nearly it approximates the area of the rear wall and in fact the greater its area the better. As shown in the drawings it is somewhat higher than the width of the tank and is supported therein upon feet $f, f$, being held in place by a hanger F supported from above.

The construction of the screen D will be understood from Fig. 4 which is a vertical section thereof. It comprises a box $d$ of sheet iron all the joints of which are made watertight to prevent the leakage of water into it. The interior of the box comprises a series of partitions $d^1$ preferably of wood fastened at the top and bottom or at the sides to wooden braces $d^2$ by which they are maintained in such relation to each other as to provide air spaces $d^3$. The partitions may be as thin as is practicable and they should be as many in number as the space will admit. The main feature of the screen, however, is sufficiently indicated, that feature being the alternation of strata of different sound-transmitting properties so that the sound waves in attempting to pass through the screen are required to pass through a number of layers of material no successive two of which are of the same transmitting character. Thus the velocity of the sound waves in passing through the screen is constantly changing and they generally lose their energy.

The transmitters E, $E^1$, are hung from a suitable frame through which pass their conductors $e$ by which they are suspended. I prefer to suspend them say from one to two feet from the ship's hull and about a diameter from the front of the screen—that is, the diameter of the transmitters being say two inches, the back of each transmitter is about two inches from the front of the screen.

In vessels where the bow is very sharp and the transmitters must be located where the bow is very narrow, a single tank can be used and a single screen of the above character can be used located say midway between the two transmitters. Usually, however, two tanks and two screens serve the purpose better.

The sound waves strike the hull of the ship and penetrate it, striking the water in the tank and thus the transmitters, and such of the waves as might influence the transmitters upon the other side of the ship are prevented from so doing owing to the screen which interferes with their progress and serves to deaden them, rendering them ineffective to confuse the sounds which are being normally received by the transmitters on the other side of the ship.

I have shown in Figs. 5 and 6 what may be termed portable sound transmitters and screens. The transmitters and screens in these cases are attached together in any convenient way and the whole is supported from a rod or handle G preferably provided with a cross bar $g$ which being parallel with the face of the screen will indicate the direction in which the face of the transmitter points. By turning the transmitter and screen in various directions and listening at the same time at the telephonic receiver the direction from which the sound waves are coming may be determined and hence a proper course laid for the vessel. This application of my invention is especially useful in the case of small boats, fishing boats or yachts.

I have referred to the use of transmitter tanks when water ballast is used. This is usually necessary because when the vessel is loaded the water is drawn off from the water ballast tank and the transmitter tanks then supply the liquid in which the transmitters must be submerged for the best results.

While the screen is shown as having its partitions parallel with the face of the transmitters, this is not essential for if they or any part of them are at an angle thereto the refraction of the sound waves on striking them will in that case assist in their effectiveness as a factor in preventing the sound waves from operating the transmitters on the opposite side of the screen.

What I claim as my invention is:—

1. In an apparatus of the kind described, the combination with the hull of a vessel, and a water tank within said hull and extending across from side to side thereof, of a pair of microphones located within said tank adjacent the opposite sides of said hull respectively, and one or more sound screens within said tank between said microphones.

2. In an apparatus of the kind described, the combination with the hull of a vessel, and a water tank within said hull and extending across from side to side thereof, of a pair of microphones located within said tank adjacent the opposite sides of said hull respectively, and a pair of sound screens located within said tank adjacent said microphones respectively, said screens being of relatively large dimensions with respect to said microphones and being located closely adjacent thereto.

3. In an apparatus of the kind described, the combination with the hull of a vessel, and a water tank within said hull and extending across from side to side thereof, of a pair of microphones located within said tank adjacent the opposite sides of said hull respectively, and one or more sound screens within said tank between said microphones, said screens each comprising a water tight casing containing a series of partitions therein, and dividing its interior into gas containing chambers.

4. In an apparatus of the kind described, the combination with a water containing tank, of a sound screen within said tank comprising a water tight casing having two or more solid walls or partitions inclosing between them one or more gas containing chambers.

5. In an apparatus of the kind described, the combination with the hull of a vessel, and a water tank within said hull, the outer wall of said tank being formed by a portion of the outer wall of said hull, of a sound receiving instrument within said tank, and a sound screen within said tank adjacent said instrument, said screen comprising a water tight casing having two or more solid walls or partitions inclosing between them one or more gas containing chambers.

ROBERT L. WILLIAMS.

In the presence of—
M. E. FLAHERTY,
W. P. O'BRIEN.